July 11, 1950           B. A. ANDERSSON           2,514,462
LUGGAGE CARRIER FOR AUTOMOBILES
Filed Feb. 5, 1948           2 Sheets-Sheet 1
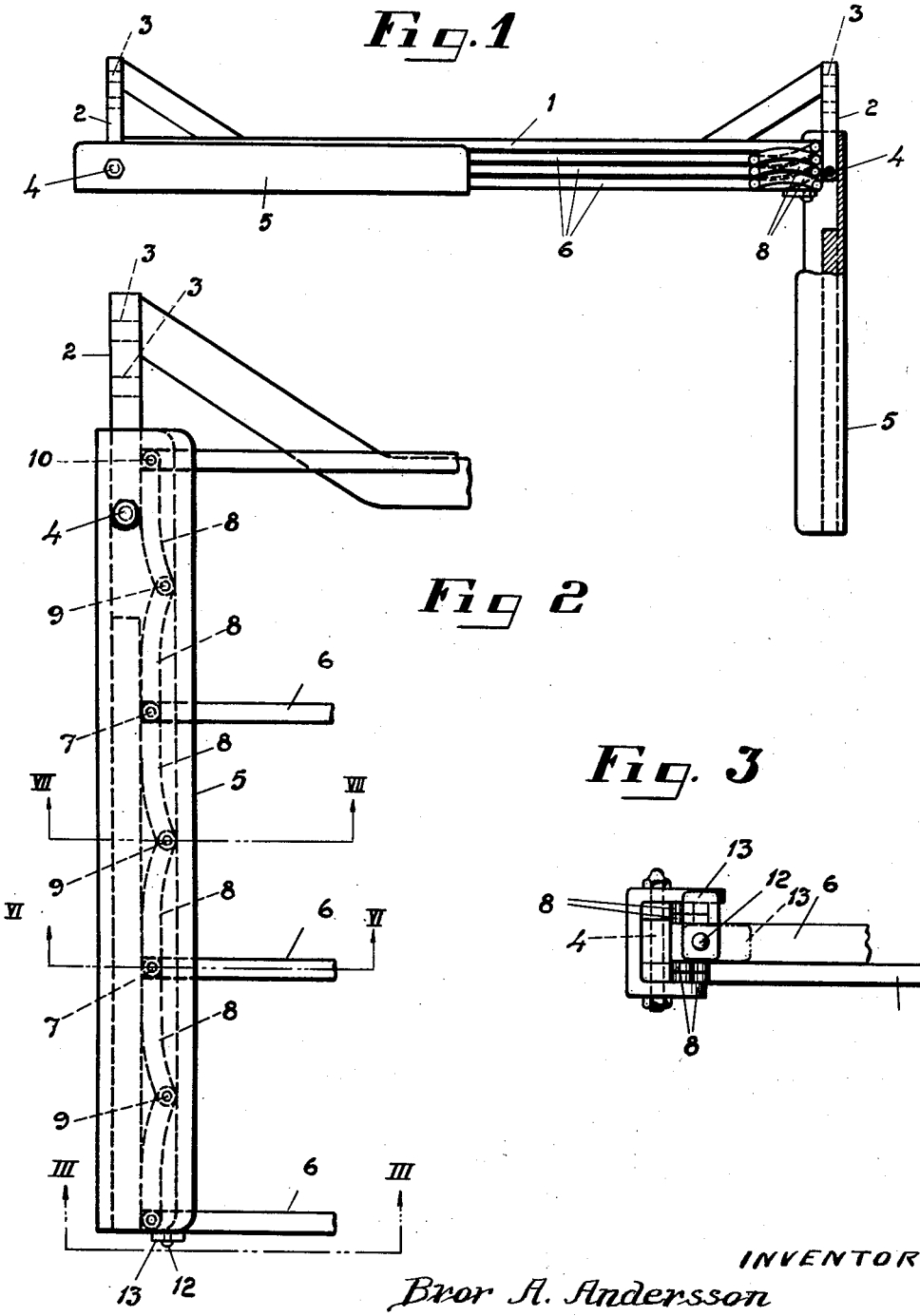
INVENTOR.
Bror A. Andersson
By Linton & Linton
Attys.

July 11, 1950  B. A. ANDERSSON  2,514,462
LUGGAGE CARRIER FOR AUTOMOBILES
Filed Feb. 5, 1948  2 Sheets-Sheet 2
Fig. 4
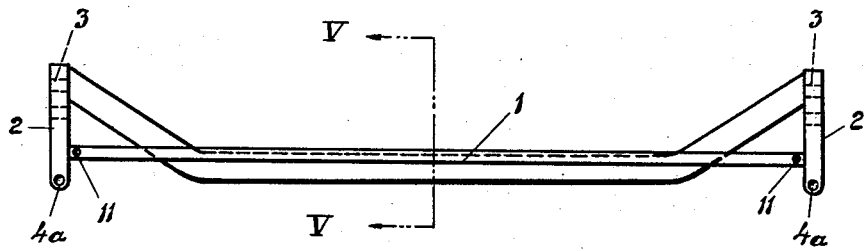
Fig. 5
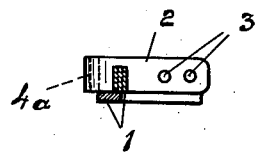
Fig. 6  Fig. 7
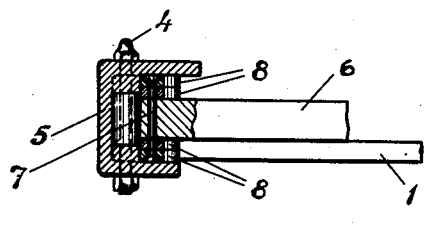 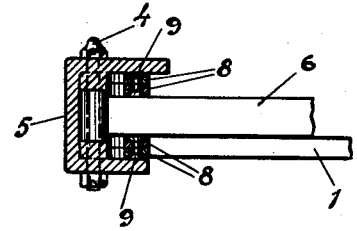
INVENTOR.
Bror A. Andersson
By Linton & Linton
Attorneys Patented July 11, 1950

2,514,462

UNITED STATES PATENT OFFICE 2,514,462

LUGGAGE CARRIER FOR AUTOMOBILES

Bror Adolf Andersson, Boras, Sweden

Application February 5, 1948, Serial No. 6,506
In Sweden July 27, 1946

Section 1, Public Law 690, August 8, 1946
Patent expires July 27, 1966

3 Claims. (Cl. 224—42.36)

The present invention relates to luggage carriers for automobiles of the kind comprising two arms pivoted on a transverse supporting member adapted to be secured to the rear end of the automobile, said arms being swingable from an inoperative position along the transverse supporting member to an operative position parallel to the longitudinal axis of the automobile. More particularly the invention relates to luggage carriers of the kind referred to in which a number of transverse slats or rods are, in operative position of the swingable arms, slidable from and to the transverse supporting member with their ends supported and guided by said arms.

The invention has for its object to provide a luggage carrier of the kind referred to which is simple in construction and which may by a simple grasp be brought from an inoperative to an operative position, and vice versa.

The invention is broadly characterized in that the slidable slats or rods are at their ends interconnected by means of links pivoted to the ends of said rods and to each other, so that in operative position of the swingable arms the rods from a position close to the transverse supporting member may all be distributed along the arms by pulling the outmost rod in the direction from the transverse supporting member.

According to a suitable embodiment of the invention the swingable arms are U-shaped in cross section and adapted to embrace in inoperative position the rods brought together along the transverse supporting member.

The nature of the invention will best be understood when described in connection with the accompanying drawings, in which Figure 1 is a plan view partly in section illustrating the novel luggage carrier with the rods brought together along the supporting member to inoperative position and with one of the swingable arms swung out to a position parallel to the longitudinal axis of the automobile. Figure 2 is a fragmentary plan view on a larger scale of a portion of the luggage carrier in operative position. Figure 3 is an end view of certain parts of the luggage carrier seen in the direction of the arrows III—III in Figure 2. Figure 4 is a plan view of the transverse supporting member. Figure 5 is a cross section of the supporting member along the line V—V in Figure 4, and Figures 6 and 7 are sections of certain parts along the line VI—VI and VII—VII respectively in Figure 2.

Referring to the drawings 1 designates a U-shaped supporting member (see Figure 4) adapted to be secured to the rear end of the frame of an automobile at right angles to the longitudinal axis of the automobile. In the end portions 2 of the supporting member 1 apertures 3 are provided designed to receive clamping screws (not shown) for securing the supporting member to the rear end of the frame of the automobile. To each of the end portions 2 there is by means of a vertical spindle 4 passing through a hole 4a in said end portion 2 pivoted an arm 5 U-shaped in cross section and swingable from the inoperative position along the supporting member 1 (shown to the left in Figure 1) to the operative position parallel to the longitudinal axis of the automobile (shown in Figure 2 and to the right in Figure 1). Along the arms 5 thus swung out to operative position there are slidable a number of transverse slats or rods 6 having their end portions placed between the flanges of the arms 5. From the inoperative position shown in Figure 1 the rods 6 may be distributed along the arms 5 to the operative position shown in Figure 2 in which they form a platform for the luggage. According to the invention the ends of the rods 6 are interconnected by means of links 8 pivoted to the ends of the rods 6 by means of spindles 7 and pivotally connected to each other by means of spindles 9. A series of such links 8 is provided above the rods 6 and another series of such links 8 is provided beneath the rods 6, as clearly appears from Figures 6 and 7. The innermost links 8 are pivoted to the supporting member 1 by means of spindles 10 passing through vertical holes 11 in the supporting member 1 near the ends of the same.

In the swung out position of the arms 5 the rods 6 may be pulled out and distributed along the arms 5 simply by exerting a pull on the outermost rod 6. As the luggage carrier is to be brought back to inoperative position one pushes the outermost rod 6 towards the supporting member 1, whereby all of the rods are assembled along the supporting member 1, whereupon the arms 5 are swung to the position shown to the left in Figure 1, whereby the U-shaped arms 5 embrace the rods 6 assembled.

At each end of the outermost rod 6 there is by means of a bolt 12 pivoted a catch 13 swingable from the inoperative position shown in dotted lines in Figure 3 to the position shown with full lines in said figure, and in the last mentioned position the catch 13 engages the rear end of the arm 5 thereby retaining the rods 6 in the operative position shown in Figure 2.

What I claim is:

1. An improvement in luggage carriers for automobiles comprising a supporting member adapted to be secured to the rear of an automobile, a pair of spaced arms each pivotally connected to said supporting member, a series of rods extending substantially parallel to said supporting member, a plurality of links each pivotally connected to an end of one of said rods and to the links of the succeeding rods, said plurality of links being further pivotally connected to said supporting member, and said arms having channelways formed therein for receiving said rods when extended therewith and forming guideways for the ends of said rods when pivoted to a position laterally of said supporting member.

2. An improvement in luggage carriers for automobiles comprising a supporting member adapted to be secured to the rear of an automobile, a pair of spaced arms each pivotally connected to said supporting member, a series of rods extending substantially parallel to said supporting member, a plurality of links each pivotally connected to an end of one of said rods and to the links of the succeeding rods, said plurality of links being further pivotally connected to said supporting member, said arms having channelways formed therein for receiving said rods when extended therewith and forming guideways for the ends of said rods when pivoted to a position laterally of said supporting member and a latch carried by one of said rods for engaging the end of one of said arms for retaining said rods when extended in said guideways.

3. An improvement in luggage carriers for automobiles comprising a supporting member adapted to be secured to the rear of an automobile, a pair of arms each pivotally connected to an end portion of said supporting member, a series of rods extending substantially parallel to said supporting member, a plurality of links pivotally connected in series with two series each pivotally connected to the top of one end of said rods and two series each pivotally connected to the bottom of one end of said rods, said series of links being further pivotally connected to said supporting member and said arms having channelways formed therein for receiving said rods and links when extended therewith and forming guideways for the ends of said rods and said links when pivoted to a position laterally of said supporting member.

BROR ADOLF ANDERSSON.

REFERENCES CITED

The following references are of record in the file of this patent:

UNITED STATES PATENTS

| Number | Name | Date |
|---|---|---|
| 590,983 | Herman | Oct. 5, 1897 |
| 1,449,711 | Natson | Mar. 27, 1923 |
| 1,510,604 | Pawsat | Oct. 7, 1924 |
| 1,743,406 | Stone | Jan. 14, 1930 |
| 1,886,911 | Schulman | Nov. 8, 1932 |
| 2,091,071 | Girl | Aug. 24, 1937 |
| 2,401,388 | Striker | June 4, 1946 |